H. H. TAYLOR.
CLUTCH.
APPLICATION FILED JULY 13, 1907.
904,463.
Patented Nov. 17, 1908.
2 SHEETS—SHEET 2.
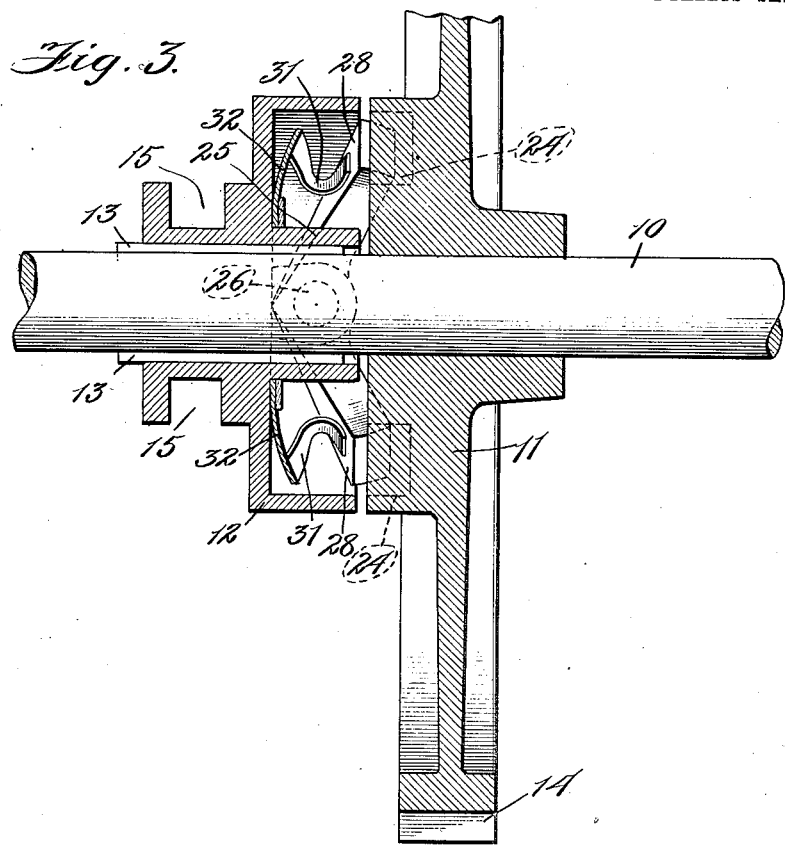
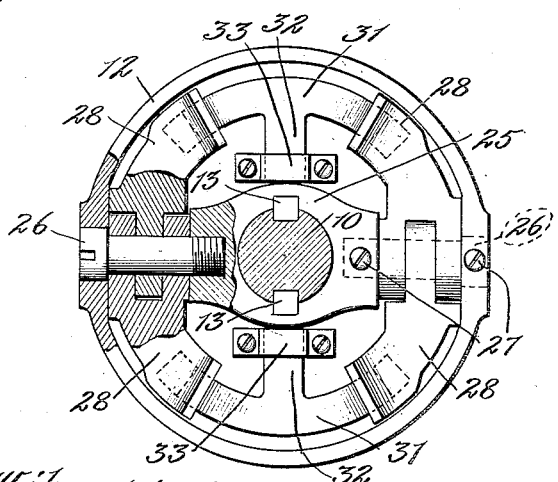
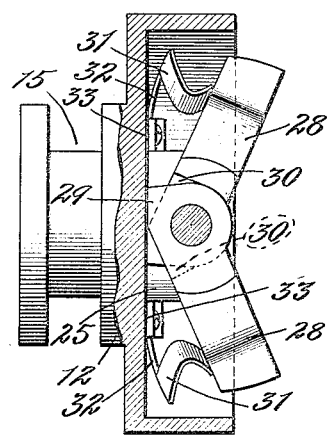
Witnesses:
Ira D. Perry
Robert H. Weir
Inventor:
Horace H. Taylor,
by Bond Adams Pickard Jackson
his Attys.

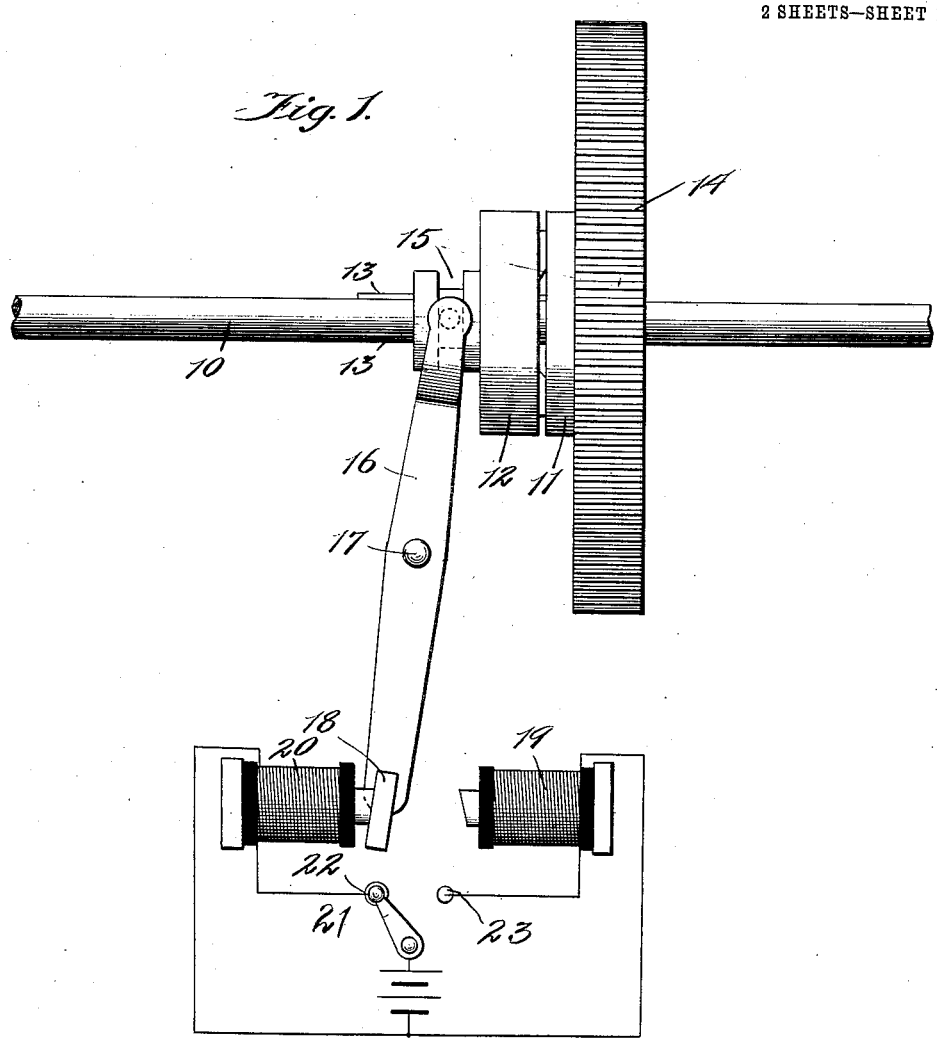

UNITED STATES PATENT OFFICE.

HORACE H. TAYLOR, OF SAN JOSE, CALIFORNIA, ASSIGNOR OF ONE-HALF TO HIMSELF AND ONE-HALF TO FRANK J. MAYHEW, OF SAN FRANCISCO, CALIFORNIA.

CLUTCH.

No. 904,463.   Specification of Letters Patent.   Patented Nov. 17, 1908.

Application filed July 13, 1907. Serial No. 383,629.

*To all whom it may concern:*

Be it known that I, HORACE H. TAYLOR, a citizen of the United States, residing at San Jose, county of Santa Clara, State of California, have invented certain new and useful Improvements in Clutches, of which the following is a specification, reference being had to the accompanying drawings.

My invention relates to clutches, and is especially designed for use in connection with electric operating mechanism.

As is well known, in order that a magnet may work with in any measure nearly its greatest effectiveness, there must be actual close contact between the magnet and the body to be attracted. It will be seen then that if an ordinary clutch member adapted to have positive engagement with its coacting clutch member in whichever direction it rotates be brought by means of a magnet acting upon an appropriate armature into contact with its coacting clutch member, if the two members happen to be in position to mesh the armature can come into the close contact necessary with the magnet, but if the members happen to be in any other relative position the parts of the two clutch members impinge and prevent the armature from attaining effective contact and permitting the clutch members to slip upon each other.

The objects of my invention are to provide a new and improved clutch which may be used in connection with any operating means, and which when used in connection with electrically operated means will avoid the difficulty above mentioned,—which may be thrown into positive operative engagement without slipping to any extent,—and to provide further improvements as hereinafter pointed out. I accomplish these objects by the means illustrated in the drawings and hereinafter fully described.

That which I believe to be new will be set forth in the claims.

In the accompanying drawings:—Figure 1 is a side elevation of my complete device consisting of a clutch member feathered upon a shaft and a gear loosely mounted upon the shaft, the hub of which gear constitutes the other clutch member, and showing also a magnet and armature by which the device is adapted to be operated. Fig. 2 is a view of the face of the hub portion of the gear shown in Fig. 1. Fig. 3 is a central cross section through the two clutch members in mesh. Fig. 4 is a view of the face of the male clutch member, partly in section. Fig. 5 is a side view of the male clutch, with a part of the casing broken away.

Referring to the several figures of the drawings, in which corresponding parts are indicated by like reference characters, 10 indicates a shaft, 11 indicates a clutch member loosely mounted on said shaft, and 12 indicates a clutch member mounted on said shaft and, in the construction shown, prevented from rotation thereon by feathers 13. The clutch member 11, in the construction shown, has formed with it a gear 14. The clutch member 12 is provided, in the construction shown, with a suitable groove 15 whereby the clutch member may be shifted on the shaft 10 and feathers 13 by any suitable means. In the construction illustrated, this shifting means consists of a lever 16 pivoted at 17 and provided at its lower end with a suitable armature 18 which is adapted to be attracted to and held by electro-magnets 19 or 20 according as the switch 21 is upon the contact 23 or 22, as will be readily understood.

Referring to Fig. 2, 24 indicates two arc-shaped grooves in the face of the clutch member 11 adapted to receive the projecting dogs of the other clutch member hereinafter described.

Referring particularly to Figs. 3, 4 and 5, it will be seen that the part 12 is a hollow casing provided with an inner hub 25. This hub portion 25 is thicker at each side to receive a pivot pin 26 which is screw-threaded into suitable openings in the wall of said hub and the outer casing, being held against displacement by other screws 27. On each pin 26 are pivoted two dogs 28 which are the same distance from the shaft and have the same curvature as the grooves 24 of the clutch member 11. As shown in Fig. 5, each dog is provided on its under face with a shoulder 29 which serves to prevent the dog from projecting unduly beyond the face of the clutch member 12. The dogs are cut away as indicated at 30 in Fig. 5 to provide the necessary clearance when the dogs are retracted. The free ends of the dogs 28 are held normally projected beyond the face of the clutch member 12 by springs, one such spring being provided at each side of the inner hub portion 25 of the casing 12.

Each of these springs, in the construction shown, consists of an arc-shaped portion 31, and a radial arm portion 32, the end of the arm portion 32 being held in place by means of a cap 33 secured by screws as shown or otherwise. The arm portion 32 normally diverges slightly from the surface to which it is attached, and the arc-shaped portion 31 extending in both directions from the arm portion 32 diverges still further from said surface, and the ends of the arc-shaped portion are turned back upon themselves, as shown, for example, in Fig. 3.

In operation, when the clutch member 12 is brought up against the face of the clutch member 11, one or more of the dogs 28 may be retracted by having its end brought into contact with the solid portion of the face of the clutch 11. When, however, the member 12 has had a partial rotation in either direction with the shaft 10, the ends of the dogs 28 reach the ends of the grooves 24 of the clutch member 14, and the springs cause such dogs to engage the ends of the grooves 24, the two members being thus firmly locked to rotate together in either direction.

Referring more particularly to Fig. 1, when the switch 21 is brought to the position illustrated in that figure, the magnet 20 is energized and the armature 18 is attracted. Inasmuch as the dogs 28 are free to be forced back inside the casing 12, they do not prevent the armature 18 from attaining the close contact necessary for effective work, and the clutch members immediately attain absolute positive engagement without any slipping and avoiding all the shock and wear of the parts due to such slipping.

The grooves 24 of the member 11 are made of such length as to receive the ends of the dogs 28 when they are forced out to their full extent and permit of little or no play, and the ends of grooves 24 are shaped to conform to the shape of the rounded ends of the dogs.

It will be understood that either the shaft 10 or the gear on the clutch member 11 may be driven from any suitable source of power, the rotation of the one being transmitted to the other through the clutch in either case. It will also be understood that it is immaterial which one of the clutch members is provided with the dogs 28 and which one with the grooves 24, and that it is likewise immaterial which one of the clutch members is provided with the gear.

While I have described my device in connection with electrically operated shifting means, and while it is especially designed for such use, yet I wish it understood that any suitable shifting means may be employed.

What I claim as my invention and desire to secure by Letters Patent is:—

1. In a clutch, the combination with a clutch member feathered upon a shaft, said clutch member comprising a hollow casing provided with a hub portion, a pivot pin mounted between the hub portion and the outer wall of the casing, two curved dogs pivoted on said pin, each of said dogs having a shoulder on its lower face to limit the extent to which it may be projected from the casing, and a spring in connection with each dog adapted to hold its free end normally projected beyond the face of the casing, of a second clutch member rotatably mounted on said shaft and provided with a groove in its face suitable for receiving the ends of said projected dogs whereby the two clutch members may be rotated positively together.

2. In a clutch, the combination with a clutch member provided with a radially-disposed axle and two retractable spring-actuated dogs mounted on said axle and extending circumferentially in opposite directions from said axle, of a clutch member provided with a groove in its face suitable for receiving the ends of said projected dogs whereby the two clutch members may be rotated positively together in either direction.

3. In a clutch, the combination with a clutch member provided with a radially-disposed axle and two retractable spring-actuated dogs mounted on said axle and extending circumferentially in opposite directions from said axle, of a clutch member provided with a groove in its face suitable for receiving the ends of said projected dogs whereby the end face of one dog or the other contacts with one end face of said groove to cause rotation in the direction that said dog extends from said axle.

HORACE H. TAYLOR.

Witnesses:
 WILLIAM H. DE BUSK,
 MINNIE A. HUNTER.